United States Patent
Kim et al.

(10) Patent No.: US 11,459,456 B2
(45) Date of Patent: Oct. 4, 2022

(54) THERMOPLASTIC RESIN COMPOSITION FOR PLATING

(71) Applicant: LOTTE CHEMICAL CORPORATION, Seoul (KR)

(72) Inventors: Kyoung Ju Kim, Uiwang-si (KR); Kee Hae Kwon, Uiwang-si (KR); Myung Hun Kim, Uiwang-si (KR); Jung Woo Park, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 180 days.

(21) Appl. No.: 16/958,177

(22) PCT Filed: Dec. 31, 2018

(86) PCT No.: PCT/KR2018/016968
§ 371 (c)(1),
(2) Date: Jun. 26, 2020

(87) PCT Pub. No.: WO2019/132628
PCT Pub. Date: Jul. 4, 2019

(65) Prior Publication Data
US 2020/0369877 A1    Nov. 26, 2020

(30) Foreign Application Priority Data

Dec. 31, 2017 (KR) .......................... 10-2017-0185028

(51) Int. Cl.
*C08L 69/00* (2006.01)
*C08L 51/00* (2006.01)
*C08L 51/06* (2006.01)

(52) U.S. Cl.
CPC ............. *C08L 69/00* (2013.01); *C08L 51/003* (2013.01); *C08L 51/06* (2013.01); *C08L 2205/025* (2013.01); *C08L 2205/035* (2013.01)

(58) Field of Classification Search
CPC ........ C08L 51/04; C08L 55/02; C08L 51/003; C08L 51/06; C08L 69/00; C08L 2205/035
See application file for complete search history.

(56) References Cited

U.S. PATENT DOCUMENTS

| 6,503,628 B1 | 1/2003 | Janarthanan et al. |
| 2016/0319128 A1 | 11/2016 | Park et al. |
| 2016/0340508 A1* | 11/2016 | Kim .................. C08L 23/0869 |
| 2017/0313870 A1 | 11/2017 | Kim et al. |

FOREIGN PATENT DOCUMENTS

| KR | 10-2001-0052949 A | 6/2001 |
| KR | 10-0292878 B1 | 6/2001 |
| KR | 10-2016-0129746 A | 11/2016 |
| KR | 10-2016-0129961 A | 11/2016 |
| KR | 10-2017-0052892 A | 5/2017 |
| WO | 2019/132628 A1 | 7/2019 |

OTHER PUBLICATIONS

International Search Report in counterpart International Application No. PCT/KR2018/016968 dated Apr. 9, 2019, pp. 1-6.

* cited by examiner

*Primary Examiner* — Jeffrey C Mullis
(74) *Attorney, Agent, or Firm* — Additon, Pendleton & Witherspoon, P.A.

(57) ABSTRACT

A thermoplastic resin composition for plating of the present invention comprises: about 35 wt % to about 60 wt % of a polycarbonate resin; about 1 wt % to about 20 wt % of a first rubber modified vinyl graft copolymer; about 5 wt % to about 30 wt % of a second rubber modified vinyl graft copolymer; and about 25 wt % to about 50 wt % of an aromatic vinyl copolymer resin, wherein the first rubber modified aromatic vinyl graft copolymer and the second rubber modified aromatic vinyl graft copolymer are present in a weight ratio of about 1:1 to about 1:10. The thermoplastic resin composition for plating and a plated molded product comprising the same have good etching property, plating adhesion, impact resistance, heat resistance and the like.

9 Claims, 1 Drawing Sheet

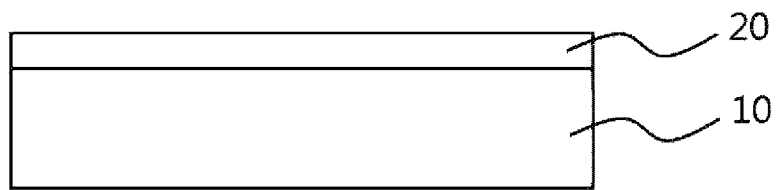

THERMOPLASTIC RESIN COMPOSITION FOR PLATING

TECHNICAL FIELD

The present invention relates to a thermoplastic resin composition for plating. More particularly, the present invention relates to a thermoplastic resin composition for plating, which has good properties in terms of etching properties, plating adhesion, impact resistance, heat resistance, and the like, and a plated molded article comprising the same.

BACKGROUND ART

For automobiles, electric/electronic devices, and office automation equipment, there is an increasing need for novel thermoplastic resin compositions for plating (plastic materials) corresponding to increasing demand for plated plastic products for the purpose of reducing manufacturing costs through reduction in weight of materials and providing good external appearance while maintaining metallic appearance.

Among various thermoplastic resin compositions, a thermoplastic resin composition (PC/ABS blend and the like) including a polycarbonate (PC) resin and a rubber-modified aromatic vinyl copolymer resin, such as an acrylonitrile-butadiene-styrene (ABS) copolymer resin and the like, is applied to various fields, since this type of thermoplastic resin composition can improve processability and chemical resistance of products without deterioration in impact resistance, heat resistance, and the like, and allows reduction in material cost.

However, the PC/ABS blend can generate a non-plated portion upon plating due to insufficient etching properties thereof, causing significant deterioration in plating adhesion, as compared with typical thermoplastic resin compositions for plating.

Therefore, there is a need for development of a thermoplastic resin composition for plating, which can improve etching properties, plating adhesion, impact resistance, heat resistance, and the like.

The background technique of the present invention is disclosed in Korean Patent Registration No. 10-0292878 and the like.

DISCLOSURE

Technical Problem

It is one aspect of the present invention to provide a thermoplastic resin composition for plating, which has good properties in terms of etching properties, plating adhesion, impact resistance, heat resistance, and the like.

It is another aspect of the present invention to provide a plated molded product comprising the thermoplastic resin composition for plating.

The above and other aspects of the present invention can be achieved by the present invention described below.

Technical Solution

1. One aspect of the present invention relates to a thermoplastic resin composition for plating. The thermoplastic resin composition for plating comprises: about 35 wt % to about 60 wt % of a polycarbonate resin; about 1 wt % to about 20 wt % of a first rubber modified vinyl graft copolymer; about 5 wt % to about 30 wt % of a second rubber modified vinyl graft copolymer; and about 25 wt % to about 50 wt % of an aromatic vinyl copolymer resin, wherein the first rubber modified vinyl graft copolymer is a quaternary graft copolymer obtained through graft copolymerization of an alkyl (meth)acrylate, an aromatic vinyl monomer and a copolymerizable monomer to a rubber polymer, the second rubber modified vinyl graft copolymer is a ternary graft copolymer obtained through graft copolymerization of an aromatic vinyl monomer and a copolymerizable monomer to a rubber polymer, and the first rubber modified vinyl graft copolymer and the second rubber modified vinyl graft copolymer are present in a weight ratio of about 1:1 to about 1:10.

2. In Embodiment 1, the aromatic vinyl copolymer resin may be a polymer of a monomer mixture comprising an aromatic vinyl monomer and a vinyl cyanide monomer.

3. In Embodiment 1 or 2, the thermoplastic resin composition may have an adhesion strength of about 500 gf/cm to about 700 gf/cm, as measured on a 30 μm thick Cr-plating layer of an injection-molded specimen having a size of 10 cm×10 cm×0.3 cm at a peeling rate of 50 mm/min using a tensile tester.

4. In Embodiments 1 to 3, the thermoplastic resin composition may have a notched Izod impact strength of about 35 kgf·cm/cm to about 65 kgf·cm/cm, as measured on a ¼" thick notched Izod specimen in accordance with ASTM D256.

5. In Embodiments 1 to 4, the thermoplastic resin composition may have a heat deflection temperature (HDT) of about 90° C. to about 120° C., as measured at a heating rate of 120° C./hr under a load of 1.8 MPa in accordance with ASTM D648.

6. Another aspect of the present invention relates to a plated molded product. The plated molded product comprises a base layer; and a plating layer formed on at least one surface of the base layer, wherein the base layer is formed of the thermoplastic resin composition for plating according to any one of Embodiments 1 to 5.

Advantageous Effects

The present invention provides a thermoplastic resin composition for plating, which has good properties in terms of etching properties, plating adhesion, impact resistance, heat resistance and the like, and a plated molded product comprising the same.

BRIEF DESCRIPTION OF DRAWINGS

FIG. 1 is a schematic sectional view of a plated molded product according to one embodiment of the present invention.

BEST MODE

Hereinafter, embodiments of the present invention will be described in detail.

A thermoplastic resin composition for plating according to the present invention comprises: (A) a polycarbonate resin; (B) a first rubber-modified aromatic vinyl graft copolymer; (C) a second rubber-modified aromatic vinyl graft copolymer; and (D) an aromatic vinyl copolymer resin.

As used herein to represent a specific numerical range, "a to b" is defined as "≥a and ≤b".

(A) Polycarbonate Resin

The polycarbonate resin according to one embodiment of the present invention may comprise any typical polycarbonate resin used for thermoplastic resin compositions. For example, the polycarbonate resin may be an aromatic polycarbonate resin prepared by reacting diphenols (aromatic diol compounds) with a precursor, such as phosgene, halogen formate, carbonate diester, and the like.

In some embodiments, the diphenols may comprise, for example, 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, 2,2-bis(3-methyl-4-hydroxyphenyl)propane, and 2,2-bis(3,5-dimethyl-4-hydroxyphenyl)propane, without being limited thereto. For example, the diphenols may be 2,2-bis(4-hydroxyphenyl)propane, 2,2-bis(3,5-dichloro-4-hydroxyphenyl)propane, 2,2-bis(3,5-dimethyl-4-hydroxyphenyl)propane, 2,2-bis(3-methyl-4-hydroxyphenyl)propane, or 1,1-bis(4-hydroxyphenyl)cyclohexane, specifically 2,2-bis(4-hydroxyphenyl)propane, which is also referred to as bisphenol-A.

In some embodiments, the polycarbonate resin may be a branched polycarbonate resin. For example, the polycarbonate resin may be a polycarbonate resin prepared by adding about 0.05 parts by mole to about 2 parts by mole of a tri-or higher polyfunctional compound, specifically a tri- or higher valent phenol group-containing compound, relative to about 100 parts by mole of the diphenols used in polymerization.

In some embodiments, the polycarbonate resin may be a homopolycarbonate resin, a copolycarbonate resin, or a blend thereof. In addition, the polycarbonate resin may be partly or completely replaced by an aromatic polyestercarbonate resin obtained by polymerization in the presence of an ester precursor, for example, a bifunctional carboxylic acid.

In some embodiments, the polycarbonate resin may have a weight average molecular weight (Mw) of about 15,000 g/mol to about 35,000 g/mol, for example, about 20,000 g/mol to about 32,000 g/mol, as measured by gel permeation chromatography (GPC). Within this range, the thermoplastic resin composition can have good properties in terms of flowability (processability), impact resistance, heat resistance, and the like.

In some embodiments, the polycarbonate resin may be present in an amount of about 35 wt % to about 60 wt %, for example, about 35 wt % to about 50 wt %, based on a total of 100 wt % of the thermoplastic resin composition for plating. If the content of the polycarbonate resin is less than about 35 wt %, the thermoplastic resin composition for plating (molded product) can suffer from deterioration in impact resistance, heat resistance, and the like, and if the content of the polycarbonate resin exceeds about 60 wt %, the thermoplastic resin composition for plating (molded product) can suffer from deterioration in etching properties, flowability, and the like.

(B) First Rubber-Modified Aromatic Vinyl Graft Copolymer

The first rubber-modified aromatic vinyl graft copolymer according to the present invention serves to improve etching properties, plating adhesion, impact resistance, and the like of the thermoplastic resin composition for plating (molded product) and may be a quaternary graft copolymer obtained through graft copolymerization of an alkyl (meth)acrylate, an aromatic vinyl monomer and a copolymerizable monomer to a rubber polymer. For example, the first rubber-modified aromatic vinyl graft copolymer may be obtained by graft copolymerization of a monomer mixture of the alkyl (meth)acrylate, the aromatic vinyl monomer and the copolymerizable monomer to the rubber polymer. Here, the polymerization may be performed by any typical polymerization method, such as emulsion polymerization, suspension polymerization, bulk polymerization, and the like.

In some embodiments, the rubber polymer may comprise, for example, diene rubbers, such as polybutadiene, poly(styrene-butadiene), and poly(acrylonitrile-butadiene); saturated rubbers obtained by adding hydrogen to the diene rubbers; isoprene rubbers; acrylic rubbers, such as poly(butyl acrylate) and the like; ethylene-propylene-diene monomer terpolymer (EPDM), and the like. These may be used alone or as a mixture thereof. For example, the rubber polymer may comprise diene rubbers, specifically polybutadiene rubbers. In addition, the rubber polymer (rubber particle) may have an average particle diameter of about 100 nm to about 400 nm, for example, about 150 nm to about 350 nm. Within this range, the thermoplastic resin composition for plating (molded product) can have good properties in terms of plating adhesion, molding processability, mechanical properties, and the like. Here, the average particle diameter means a Z-average measured using a dynamic light scattering analyzer.

In some embodiments, the rubber polymer may be present in an amount of about 35 wt % to about 70 wt %, for example, about 40 wt % to about 65 wt %, based on about 100 wt % of the first rubber-modified aromatic vinyl graft copolymer. Within this range, the thermoplastic resin composition for plating (molded product) can have stable properties in terms of etching properties, plating adhesion, molding processability, mechanical properties, and the like.

In some embodiments, the alkyl (meth)acrylate may be graft copolymerizable with the rubber polymer or copolymerizable with an aromatic vinyl monomer, and may comprise an alkyl (meth)acrylate having a $C_1$ to $C_{10}$ alkyl group, for example, methyl (meth)acrylate, ethyl (meth)acrylate, propyl (meth)acrylate, butyl (meth)acrylate, and the like. Specifically, the alkyl (meth)acrylate may be methyl methacrylate, methyl acrylate, and the like. A component derived from the alkyl (meth)acrylate may be present in an amount of about 15 wt % to about 50 wt %, for example, about 20 wt % to about 40 wt %, based on 100 wt % of the first rubber-modified aromatic vinyl graft copolymer. Within this range, the thermoplastic resin composition for plating (molded product) can have stable properties in terms of etching properties, plating adhesion, molding processability, mechanical properties, and the like.

In some embodiments, the aromatic vinyl monomer may be graft copolymerizable with the rubber polymer and may comprise, for example, styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and combinations thereof. Specifically, the aromatic vinyl monomer may be styrene. A component derived from the aromatic vinyl monomer may be present in an amount of about 2 wt % to about 30 wt %, for example, about 5 wt % to about 20 wt %, based on 100 wt % of the first rubber-modified aromatic vinyl graft copolymer. Within this range, the thermoplastic resin composition for plating (molded product) can have stable properties in terms of etching properties, plating adhesion, molding processability, mechanical properties, and the like.

In some embodiments, the copolymerizable monomer may comprise a vinyl cyanide monomer, such as acrylonitrile, methacrylonitrile, ethacrylonitrile, phenyl acrylonitrile, α-chloroacrylonitrile, fumaronitrile, and the like; and a monomer for imparting processability and heat resistance, such as acrylic acid, methacrylic acid, maleic anhydride, N-substituted maleimide, and the like. For example, the copolymerizable monomer may be a vinyl cyanide monomer, specifically acrylonitrile. A component derived from the copolymerizable monomer may be present in an amount of about 1 wt % to about 20 wt %, for example, about 1 wt % to about 15 wt %, based on 100 wt % of the first rubber-modified aromatic vinyl graft copolymer. Within this range, the thermoplastic resin composition for plating (molded product) can have stable properties in terms of etching properties, plating adhesion, molding processability, mechanical properties, and the like.

In some embodiments, the first rubber-modified aromatic vinyl graft copolymer may be present in an amount of about 1 wt % to about 20 wt %, for example, about 2.5 wt % to about 12.5 wt %, based on 100 wt % of the thermoplastic resin composition for plating. If the content of the first rubber-modified aromatic vinyl graft copolymer is less than about 1 wt %, the thermoplastic resin composition for plating (molded product) can suffer from deterioration in etching properties, plating adhesion, impact resistance, and the like, and if the content of the first rubber-modified aromatic vinyl graft copolymer exceeds about 20 wt %, the thermoplastic resin composition for plating (molded product) can suffer from deterioration in plating adhesion and the like.

(C) Second Rubber-Modified Aromatic Vinyl Graft Copolymer

The second rubber-modified aromatic vinyl graft copolymer according to the present invention serves to improve etching properties, plating adhesion, impact resistance, and the like of the thermoplastic resin composition for plating (molded product) together with the first rubber-modified aromatic vinyl graft copolymer, and may be a ternary graft copolymer obtained through graft copolymerization of an aromatic vinyl monomer and a copolymerizable monomer to a rubber polymer. For example, the second rubber-modified aromatic vinyl graft copolymer may be obtained by graft copolymerization of a monomer mixture of the aromatic vinyl monomer and the copolymerizable monomer to the rubber polymer. Here, the polymerization may be performed by any typical polymerization method, such as emulsion polymerization, suspension polymerization, bulk polymerization, and the like.

In some embodiments, the rubber polymer may comprise, for example, diene rubbers, such as polybutadiene, poly(styrene-butadiene), and poly(acrylonitrile-butadiene); saturated rubbers obtained by adding hydrogen to the diene rubbers; isoprene rubbers; acrylic rubbers, such as poly(butyl acrylate) and the like; ethylene-propylene-diene monomer terpolymer (EPDM), and the like. These may be used alone or as a mixture thereof. For example, the rubber polymer may comprise diene rubbers, specifically polybutadiene rubbers. In addition, the rubber polymer (rubber particle) may have an average particle diameter of about 100 nm to about 400 nm, for example, about 150 nm to about 350 nm. Within this range, the thermoplastic resin composition for plating (molded product) can have good properties in terms of plating adhesion, molding processability, mechanical properties, and the like.

In some embodiments, the rubber polymer may be present in an amount of about 35 wt % to about 70 wt %, for example, about 40 wt % to about 65 wt %, based on about 100 wt % of the second rubber-modified aromatic vinyl graft copolymer. Within this range, the thermoplastic resin composition for plating (molded product) can have stable properties in terms of plating adhesion, molding processability, mechanical properties, and the like.

In some embodiments, the aromatic vinyl monomer may be graft copolymerizable with the rubber polymer and may comprise, for example, styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and combinations thereof. Specifically, the aromatic vinyl monomer may be styrene. A component derived from the aromatic vinyl monomer may be present in an amount of about 15 wt % to about 50 wt %, for example, about 20 wt % to about 45 wt %, based on 100 wt % of the second rubber-modified aromatic vinyl graft copolymer. Within this range, the thermoplastic resin composition for plating (molded product) can have stable properties in terms of plating adhesion, molding processability, mechanical properties, and the like.

In some embodiments, the copolymerizable monomer may comprise a vinyl cyanide monomer, such as acrylonitrile, methacrylonitrile, ethacrylonitrile, phenyl acrylonitrile, α-chloroacrylonitrile, fumaronitrile, and the like; and a monomer for imparting processability and heat resistance, such as acrylic acid, methacrylic acid, maleic anhydride, N-substituted maleimide, and the like. For example, the copolymerizable monomer may be a vinyl cyanide monomer, specifically acrylonitrile. A component derived from the copolymerizable monomer may be present in an amount of about 2 wt % to about 25 wt %, for example, about 5 wt % to about 20 wt %, based on 100 wt % of the second rubber-modified aromatic vinyl graft copolymer. Within this range, the thermoplastic resin composition for plating (molded product) can have stable properties in terms of plating adhesion, molding processability, mechanical properties, and the like.

In some embodiments, the second rubber-modified aromatic vinyl graft copolymer may be present in an amount of about 5 wt % to about 30 wt %, for example, about 10 wt % to about 25 wt %, based on 100 wt % of the thermoplastic resin composition for plating. If the content of the second rubber-modified aromatic vinyl graft copolymer is less than about 5 wt %, the thermoplastic resin composition for plating (molding product) can suffer from deterioration in etching properties, plating adhesion, impact resistance, and the like, and if the content of the second rubber-modified aromatic vinyl graft copolymer exceeds about 30 wt %, the thermoplastic resin composition for plating (molded product) can suffer from deterioration in heat resistance, flowability, and the like.

In some embodiments, the first rubber-modified aromatic vinyl graft copolymer (B) and the second rubber-modified aromatic vinyl graft copolymer (C) may be present in a weight ratio ((B):(C)) of about 1:1 to about 1:10, for example, about 1:1 to about 1:4. If the weight ratio ((B):(C)) is less than about 1:1, the thermoplastic resin composition for plating (molded product) can suffer from deterioration in adhesion and the like, and if the weight ratio exceeds about 1:10, the thermoplastic resin composition for plating (molded product) can suffer from deterioration in etching properties and the like.

(D) Aromatic Vinyl Copolymer Resin

The aromatic vinyl copolymer resin according to the present invention serves to improve molding processability, plating adhesion, and the like of the thermoplastic resin composition for plating (molded product), and is a polymer of a monomer mixture comprising an aromatic vinyl monomer and a vinyl cyanide monomer. For example, the aromatic vinyl copolymer resin is a copolymer of a component derived from the aromatic vinyl monomer and a component derived from the vinyl cyanide monomer, and may be obtained through copolymerization of the monomer mixture by any method well-known to those skilled in the art. In addition, a monomer for imparting processability and heat resistance may be further added to the monomer mixture to provide an aromatic vinyl copolymer resin that further comprises a component derived from the monomer for imparting processability and heat resistance.

In some embodiments, the aromatic vinyl monomer may comprise, for example, styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene, without being limited thereto. These may be used alone or as a mixture thereof. A component derived from the aromatic vinyl monomer may be present in an amount of about 40 wt % to about 90 wt %, for example, about 55 wt % to about 80 wt %, based on 100 wt % of the monomer mixture (aromatic vinyl copolymer resin). Within this range, the thermoplastic resin composition for plating (molded product) can exhibit good flowability (molding processability), and the like.

In some embodiments, the vinyl cyanide monomer may comprise, for example, acrylonitrile, methacrylonitrile, ethacrylonitrile, phenylacrylonitrile, α-chloroacrylonitrile, fumaronitrile, and the like. These may be used alone or as a mixture thereof. For example, the vinyl cyanide monomer may be acrylonitrile or methacrylonitrile. A component derived from the vinyl cyanide monomer may be present in an amount of about 10 wt % to about 60 wt %, for example, about 15 wt % to about 45 wt %, based on 100 wt % of the monomer mixture (aromatic vinyl copolymer resin). Within this range, the thermoplastic resin composition for plating (molded product) can have good compatibility, plating adhesion, and the like.

In some embodiments, the monomer for imparting processability and heat resistance may comprise, for example, (meth)acrylic acid, maleic anhydride, and N-substituted maleimide, without being limited thereto. The monomer for imparting processability and heat resistance may be present in an amount of about 30 parts by weight or less, for example, about 1 to about 25 parts by weight, based on 100 parts by weight of the monomer mixture. Within this range, the monomer for imparting processability and heat resistance can impart processability and heat resistance to the thermoplastic resin composition without deterioration in other properties.

In some embodiments, the aromatic vinyl copolymer resin may comprise a copolymer of styrene and acrylonitrile.

In some embodiments, the aromatic vinyl copolymer resin may have a weight average molecular weight of about 50,000 g/mol to about 300,000 g/mol, for example, about 90,000 g/mol to about 250,000 g/mol, as measured by gel permeation chromatography (GPC). Within this range, the thermoplastic resin composition for plating (molded product) can have good flowability (molding processability) and the like.

In some embodiments, the aromatic vinyl copolymer resin may be present in an amount of about 25 wt % to about 50 wt %, for example, about 30 wt % to about 45 wt %, based on a total of 100 wt % of the thermoplastic resin composition for plating. If the content of the aromatic vinyl copolymer resin is less than about 25 wt %, the thermoplastic resin composition for plating (molded product) can suffer from deterioration in molding processability, etching properties, and the like, and if the content of the aromatic vinyl copolymer resin exceeds about 50 wt %, the thermoplastic resin composition for plating (molded product) can suffer from deterioration in mechanical properties, plating adhesion, and the like.

The thermoplastic resin composition according to one embodiment of the invention may further comprise additives, such as inorganic fillers, flame retardants, flame retardant aids, compatibilizers, release agents, lubricants, heat stabilizers, anti-dripping agents, antioxidants, pigments, dyes, and mixtures thereof, without being limited thereto. The additives may be present in an amount of about 0.01 parts by weight to about 40 parts by weight relative to about 100 parts by weight of the polycarbonate resin, the first and second rubber-modified aromatic vinyl copolymers, and the aromatic vinyl copolymer resin.

According to one embodiment of the present invention, the thermoplastic resin composition for plating may be prepared in pellet form by mixing the aforementioned components, followed by melt extrusion at a temperature of 200° C. to 280° C., for example, 250° C. to 260° C., using a typical twin-screw extruder.

In some embodiments, the thermoplastic resin composition for plating may have an adhesion strength of about 500 gf/cm to about 700 gf/cm, for example, about 500 gf/cm to about 600 gf/cm, as measured on a 30 μm thick Cr-plating layer of an injection-molded specimen having a size of 10 cm×10 cm×0.3 cm at a peeling rate of 50 mm/min using a tensile tester.

In some embodiments, the thermoplastic resin composition for plating may have a notched Izod impact strength of about 35 kgf·cm/cm to about 65 kgf·cm/cm, for example, about 40 kgf·cm/cm to about 55 kgf·cm/cm, as measured on a ¼" thick notched Izod specimen in accordance with ASTM D256.

In some embodiments, the thermoplastic resin composition for plating may have a heat deflection temperature (HDT) of about 90° C. to about 120° C., for example, about 95° C. to about 115° C., as measured at a heating rate of 120° C./hr under a load of 1.8 MPa in accordance with ASTM D648.

FIG. 1 is a schematic sectional view of a plated molded product according to one embodiment of the present invention. It should be understood that the sizes of components are exaggerated for clarity of description in the drawings and the present invention is not limited thereto. In addition, each component may have various shapes instead of being limited to the shape shown in the drawings. Referring to FIG. 1, the plated molded product according to the embodiment includes a base layer 10 and a plating layer 20 formed on at least one surface of the base layer 10, which is formed of the thermoplastic resin composition for plating according to the present invention.

In some embodiments, the base layer 10 may be formed of the thermoplastic resin composition for plating by various molding methods, such as injection molding, extrusion molding, vacuum forming, and casting. These molding methods are well known to those skilled in the art.

In some embodiments, the plating layer 20 may be formed by a typical method for manufacturing a plated plastic product, such as ABS resin plating and the like. For example, the plating layer 20 may be formed by etching the base layer 10 and forming an anchor on an etched portion thereof, followed by plating, for example, electroless plating and electric plating, without being limited thereto.

In some embodiments, in addition to electroless plating and electroplating, plating may be typical wet plating or dry plating, such as chemical vapor deposition (CVD), physical vapor deposition (PVD), plasma CVD, thermal spray coating, and the like.

In some embodiments, the plating layer 20 may comprise at least one selected from the group of chromium, nickel and copper, and may have a thickness of about 0.1 μm to about 100 μm, without being limited thereto.

The plated molded product according to the present invention has good etching properties of the base layer, good adhesion between the base layer and the plating layer, good impact resistance and heat resistance, and can be used as interior and exterior materials of products having metallic appearance, such as automobiles, electric/electronic devices, and office automation equipment. Particularly, the plated molded product is useful as an exterior material for automobiles, such as radiator grills and the like.

Mode for Invention

Next, the present invention will be described in more detail with reference to some examples. It should be understood that these examples are provided for illustration only and are not to be in any way construed as limiting the invention.

EXAMPLE

Details of components used in Examples and Comparative Examples are as follows.

(A) Polycarbonate Resin

A bisphenol-A polycarbonate resin having a weight average molecular weight (Mw) of about 22,000 g/mol was used (Manufacturer: Lotte Advanced Materials Co., Ltd.).

(B) First Rubber-Modified Aromatic Vinyl Graft Copolymer

A methyl methacrylate-acrylonitrile-butadiene-styrene graft copolymer (g-MABS) (Manufacturer: Lotte Advanced Materials Co., Ltd.) obtained by graft copolymerization of about 28 wt % of methyl methacrylate, about 8 wt % of styrene and about 4 wt % of acrylonitrile to about 60 wt % of polybutadiene rubber having an average particle size of about 250 nm as a rubber polymer was used.

(C) Second Rubber-Modified Aromatic Vinyl Graft Copolymer

An acrylonitrile-butadiene-styrene graft copolymer (g-ABS) obtained by graft copolymerization of about 30 wt % of styrene and about 10 wt % of acrylonitrile to about 60 wt % of polybutadiene rubber having an average particle size of about 250 nm as a rubber polymer was used.

(D) Aromatic Vinyl Copolymer Resin

A styrene-acrylonitrile (SAN) copolymer resin having a weight average molecular weight (Mw) of about 160,000 g/mol and comprising styrene and acrylonitrile in a weight ratio of about 70:30 was used.

Examples 1 to 6 and Comparative Examples 1 to 7

The aforementioned components were mixed in amounts as listed in Tables 1 and 2, followed by extrusion at 250° C., thereby preparing a thermoplastic resin composition in pellet form. Here, extrusion was performed using a twin-screw extruder (L/D: 36, Φ: 45 mm) and the prepared pellets were dried at a temperature of 80° C. to 100° C. for 4 hours or more and then subjected to injection molding using a 6 oz injection molding machine (molding temperature: 250° C., mold temperature: 60° C.), thereby preparing a specimen. The prepared specimen was evaluated as to the following properties. Results are shown in Tables 1 and 2.

Property Evaluation (1) Adhesion strength of plating layer (unit: gf/cm): An injection molded specimen having a size of 10 cm×10 cm×0.3 cm was plated with Cr to a plating thickness of about 30 μm and a central portion of a Cr-plating layer was cut. With the cut portion of the specimen gripped by jigs of a tensile tester, adhesion strength of the plating layer to the base layer was measured by peeling the plating layer from the base layer at a peeling rate of 50 mm/min at a peeling angle of 90° with respect to a surface of the plating layer.

(2) Notched Izod impact strength (unit: kgf·cm/cm): Impact strength was evaluated on a ¼" thick notched Izod specimen in accordance with ASTM D256.

(3) Heat deflection temperature (HDT, unit: ° C.): HDT was measured under a load of 1.8 MPa at a heating rate of 120° C./hr in accordance with ASTM D648.

(4) Etching properties: A specimen was etched, followed by evaluation of etching properties based on an area ratio occupied by etching holes obtained through observation of morphology using a scanning electron microscope.

○: 50% or more, Δ: 40% to less than 50%, x: less than 40%

TABLE 1

| | Example | | | | | |
|---|---|---|---|---|---|---|
| | 1 | 2 | 3 | 4 | 5 | 6 |
| (A) (wt %) | 40 | 40 | 40 | 40 | 40 | 45 |
| (B) (wt %) | 2.5 | 5 | 12.5 | 8 | 11 | 5 |
| (C) (wt %) | 25 | 20 | 12.5 | 17 | 14 | 20 |
| (D) (wt %) | 32.5 | 35 | 35 | 35 | 35 | 30 |
| (B):(C) (weight ratio) | 1:10 | 1:4 | 1:1 | 1:2.1 | 1:1.3 | 1:4 |
| Adhesion strength of plating layer | 570 | 550 | 500 | 530 | 510 | 570 |
| Notched Izod impact strength | 43 | 43 | 43 | 43 | 43 | 43 |
| HDT | 100 | 100 | 100 | 100 | 100 | 102 |
| Etching properties | ○ | ○ | ○ | ○ | ○ | ○ |

TABLE 2

| | Comparative Example | | | | | | |
|---|---|---|---|---|---|---|---|
| | 1 | 2 | 3 | 4 | 5 | 6 | 7 |
| (A) (wt %) | 40 | 40 | 40 | 40 | 60 | 25 | 45 |
| (B) (wt %) | — | 0.5 | 21 | 25 | 5 | 5 | 20 |
| (C) (wt %) | 25 | 24.5 | 4 | — | 20 | 20 | 5 |
| (D) (wt %) | 35 | 35 | 35 | 35 | 15 | 50 | 30 |
| (B):(C) (Weight ratio) | — | 1:49 | 1:0.19 | — | 1:4 | 1:4 | 1:0.25 |
| Adhesion strength of plating layer | 590 | 580 | 440 | 420 | 680 | 400 | 460 |
| Notched Izod impact strength | 43 | 43 | 43 | 43 | 45 | 15 | 43 |
| HDT | 100 | 100 | 100 | 100 | 110 | 95 | 102 |
| Etching properties | Δ | Δ | ○ | ○ | x | ○ | ○ |

From the results shown in Table 1, it could be seen that the thermoplastic resin compositions for plating according to the present invention had good properties in terms of etching properties, plating adhesion, impact resistance, heat resistance, and the like.

Conversely, it could be seen that the thermoplastic resin compositions of Comparative Examples 1 and 2 prepared without using the first rubber-modified aromatic vinyl graft copolymer or prepared using a small amount of the first rubber-modified aromatic vinyl graft copolymer suffered from deterioration in etching properties; the thermoplastic resin composition of Comparative Examples 3 prepared using an excess of the first rubber-modified aromatic vinyl graft copolymer and a small amount of the second rubber-modified aromatic vinyl graft copolymer suffered from deterioration in plating adhesion; and the thermoplastic resin compositions of Comparative Example 4 prepared without using the second rubber-modified aromatic vinyl graft copolymer suffered from deterioration in plating adhesion and the like. In addition, it could be seen that the thermoplastic resin composition of Comparative Example 5 prepared using an excess of the polycarbonate resin and a small amount of the aromatic vinyl copolymer resin suffered from deterioration in etching properties; and the thermoplastic resin composition of Comparative Examples 6 prepared using a small amount of the polycarbonate resin and an excess of the aromatic vinyl copolymer resin suffered from deterioration in plating adhesion, impact resistance, heat resistance, and the like. Further, it could be seen that the thermoplastic resin composition of Comparative Example 7 prepared using the first rubber-modified aromatic vinyl graft copolymer and the second rubber-modified aromatic vinyl graft copolymer not within the content ranges according to the present invention suffered from deterioration in plating adhesion and the like.

It should be understood that various modifications, changes, alterations, and equivalent embodiments can be made by those skilled in the art without departing from the spirit and scope of the present invention.

The invention claimed is:

1. A thermoplastic resin composition for plating, comprising:
    about 35 wt % to about 60 wt % of a polycarbonate resin;
    about 1 wt % to about 20 wt% of a first rubber modified vinyl graft copolymer;
    about 5 wt % to about 30 wt % of a second rubber modified vinyl graft copolymer; and
    about 25 wt % to about 50 wt % of an aromatic vinyl copolymer resin,
    wherein the first rubber modified vinyl graft copolymer is a quaternary graft copolymer obtained through graft copolymerization of an alkyl (meth)acrylate, an aromatic vinyl monomer and a copolymerizable monomer to a rubber polymer,
    wherein the second rubber modified vinyl graft copolymer is a ternary graft copolymer obtained through graft copolymerization of an aromatic vinyl monomer and a copolymerizable monomer to a rubber polymer, and
    wherein the first rubber modified vinyl graft copolymer and the second rubber modified vinyl graft copolymer are present in a weight ratio of about 1:1 to about 1:10, and
    wherein the thermoplastic resin composition has an adhesion strength of about 500 gf/cm to about 700 gf/cm, as measured on a 30 µm thick Cr-plating layer of an injection-molded specimen having a size of 10 cm×10 cm×0.3 cm at a peeling rate of 50 mm/min using a tensile tester.

2. The thermoplastic resin composition for plating according to claim 1, wherein the aromatic vinyl copolymer resin is a polymer of a monomer mixture comprising an aromatic vinyl monomer and a vinyl cyanide monomer.

3. The thermoplastic resin composition for plating according to claim 1, wherein the thermoplastic resin composition has a notched Izod impact strength of about 35 kgf·cm/cm to about 65 kgf·cm/cm, as measured on a ¼" thick notched Izod specimen in accordance with ASTM D256.

4. The thermoplastic resin composition for plating according to claim 1, wherein the thermoplastic resin composition has a heat deflection temperature (HDT) of about 90° C. to about 120° C., as measured at a heating rate of 120° C./hr under a load of 1.8 MPa in accordance with ASTM D648.

5. A plated molded product comprising:
    a base layer; and
    a plating layer formed on at least one surface of the base layer,
    wherein the base layer is formed of the thermoplastic resin composition for plating according to claim 1.

6. A thermoplastic resin composition for plating, comprising:
    about 35 wt % to about 60 wt % of a polycarbonate resin;
    about 1 wt % to about 20 wt % of a first rubber modified vinyl graft copolymer;
    about 5 wt % to about 30 wt % of a second rubber modified vinyl graft copolymer; and
    about 25 wt % to about 50 wt % of an aromatic vinyl copolymer resin,
    wherein the first rubber modified vinyl graft copolymer is a quaternary graft copolymer obtained through graft copolymerization of an alkyl (meth)acrylate, an aromatic vinyl monomer and a copolymerizable monomer to a rubber polymer,
    wherein the second rubber modified vinyl graft copolymer is a ternary graft copolymer obtained through graft copolymerization of an aromatic vinyl monomer and a copolymerizable monomer to a rubber polymer, and
    wherein the first rubber modified vinyl graft copolymer and the second rubber modified vinyl graft copolymer are present in a weight ratio of about 1:1 to about 1:10, and
    wherein the thermoplastic resin composition has a heat deflection temperature (HDT) of about 90° C. to about 120° C., as measured at a heating rate of 120° C./hr under a load of 1.8 MPa in accordance with ASTM D648.

7. The thermoplastic resin composition for plating according to claim 6, wherein the aromatic vinyl copolymer resin is a polymer of a monomer mixture comprising an aromatic vinyl monomer and a vinyl cyanide monomer.

8. The thermoplastic resin composition for plating according to claim 6, wherein the thermoplastic resin composition has a notched Izod impact strength of about 35 kgf·cm/cm to about 65 kgf·cm/cm, as measured on a ¼" thick notched Izod specimen in accordance with ASTM D256.

9. A plated molded product comprising:
    a base layer; and
    a plating layer formed on at least one surface of the base layer,
    wherein the base layer is formed of the thermoplastic resin composition for plating according to claim 6.

* * * * *